United States Patent [19]

Shirbroun

[11] 4,187,324

[45] Feb. 5, 1980

[54] SOYBEAN BEVERAGE

[76] Inventor: Darrell B. Shirbroun, Box 225, Callender, Iowa 50523

[21] Appl. No.: 796,148

[22] Filed: May 12, 1977

[51] Int. Cl.² ............................................. A23F 1/14
[52] U.S. Cl. .................................. 426/460; 426/466; 426/473; 426/489; 426/596; 426/598
[58] Field of Search .............. 426/590, 596, 489, 466, 426/473, 431, 634, 468, 469, 460

[56] References Cited

U.S. PATENT DOCUMENTS

| | | | |
|---|---|---|---|
| 1,349,000 | 8/1920 | Kellogg et al. | 426/596 X |
| 1,433,168 | 10/1922 | Yamamoto | 426/634 X |
| 2,026,676 | 1/1936 | Gill | 426/431 |
| 2,901,353 | 8/1959 | Tsurumiku | 426/431 X |
| 3,496,858 | 2/1970 | Jenkins | 426/634 |

FOREIGN PATENT DOCUMENTS 447300 12/1912 France ..................................... 426/596

*Primary Examiner*—Raymond N. Jones
*Assistant Examiner*—Robert J. Warden
*Attorney, Agent, or Firm*—Zarley, McKee, Thomte, Voorhees & Sease

[57] ABSTRACT

A coffee like beverage product prepared solely from soybeans. By the combination of conditions employed, the result is a ground and roast soybean product which can be substituted for coffee, and which tastes and appears remarkably like coffee. The process involves removing most of the oil from green soybeans, crushing the green soybeans, grinding the crushed green soybeans, and thereafter roasting the same.

5 Claims, No Drawings

SOYBEAN BEVERAGE

BACKGROUND OF THE INVENTION

As is well known, coffee is prepared from roasting coffee beans to a dark roast color, with the beans thereafter being ground to provide what is commonly referred to as fresh roast and ground coffee. Because of the special climate conditions for growing of coffee, the United States and many other colder climates of the world are totally dependent upon imports for their source of coffee. This dependency upon importations has made the price of coffee fluctuate greatly depending upon the availability of imported coffee beans, such conditions as government stability in the exporting countries, seasonal climate conditions in the exporting countries, and economically motivated export policies from the coffee growing countries. For example, during the last part of 1976 and early 1977, consumer prices for roast and ground coffee have soared to prices in excess of $4.50 per pound in many cases.

It is an object of this invention to prepare a consumer acceptable coffee substitute beverage which can be prepared from grains grown in the United States and other countries having like climactic conditions so that dependency upon foreign imports in the preparation of coffee beverages can be reduced.

Another object of this invention is to prepare a coffee substitute beverage which is considerably less expensive than roast and ground coffee.

Still another object of this invention is to prepare a coffee like beverage solely from soybeans.

A further object of this invention is to prepare a coffee like soybean beverage which both in ground and roast form and in beverage extract form has the appearance of coffee.

Another object of this invention is to prepare a ground and roast coffee like product solely from soybeans which has not only the appearance but also the taste of roast and ground coffee.

Another object of this invention is to prepare a coffee like ground and roast product which when prepared in extract form is non-caffeine containing.

Yet another important object is to prepare a product which not only has the appearance and taste of coffee, the product being prepared solely from soybeans, but importantly, the product may be used in the same volumetric measurements as roast and ground coffee so that beverage users will not have to change their measurement habits.

The method of accomplishing each of the above objects as well as others, will become apparent from the detailed description of the invention which follows below.

SUMMARY OF THE INVENTION

This invention relates to a soybean derived coffee like product. In accordance with the process, a majority of the soybean oil is substantially completely removed from green soybeans, the green beans are ground after the oil has been removed, and the ground green bean residue is thereafter roasted to a conventional coffee roast color to provide a product which has the appearance of roast and ground coffee, and which may be measured and brewed in a similar fashion to coffee to provide a coffee like appearing and tasting beverage.

In accordance with the preferred process, green soybeans are soaked to soften the bean cell walls, the beans are crushed in a flaking roller mill to expel the oil and disrupt the bean cell walls, the oil is separated from the flaked crushed green bean, the flaked crushed green bean is predried until it feels dry to touch, and thereafter ground to conventional roast and ground coffee particle sizes and finally roasted to a conventional roast color.

It should, of course, be understood that certain modifications in the process as described hereinafter may be employed and the results of this invention still achieved. Accordingly, it is to be understood that certain modifications of the process are contemplated as still being within the scope of the invention.

DETAILED DESCRIPTION OF THE INVENTION

The essence of this invention lies in the discovery that soybeans, when treated in the manner described herein, may be utilized to produce a coffee like soybean beverage. Importantly, the ground and roast soybean product has the general overall appearance of roast and ground coffee and the resulting beverage produced by percolation or steeping has the same overall taste of conventional coffee beverage.

The starting material for the preparation of the product of this invention and for use in the process of this invention is raw, green soybeans. The soybeans are beans obtainable from any conventional grain dealer. It has, however, been found that the preferred raw green soybeans for the starting material are beans which are low in oil content, and large in bean size. The larger bean sizes are preferred because the beans are easier to handle in the subsequent processing conditions. Very satisfactory results have been achieved with the use of amasoy and curasoy raw green soybeans as the starting material. However, it should be understood that any clean soybean may be utilized.

Typically the starting soybeans will have an oil content of from about 8% to about 11%. Soybean oil contents of 8% or below are considered to be low oil contents. It is also typical that the starting beans will have a moisture content within the range of from about 11% by weight to about 13% by weight. It is believed tha the starting green soybean should not have an initial moisture content which is excessively high because the result will be a "greener" taste in the end product. Typical bean moisture contents at which elevators will purchase the soybeans are satisfactory for use in this invention.

In its broadest aspect, the initial steps of the process of this invention involve separating the green cellular material of the bean from the soybean oil. As is well known, the soybean oil is of tremendous economic value in its own right and accordingly the separated soybean oil is preserved for its conventional uses. The soybean oil should be removed as completely as possible becuase it has been found that high residues of the oil will produce a typical "soy" taste in the resulting product. A variety of methods may be employed to extract the oil from the green soybeans such as solvent extraction or expelling by crushing of the green soybean. Expressing the oil during a green soybean crushing operation is a preferred manner of accomplishing the soybean oil removal because it has the additional advantage of disrupting the bean cell walls in order to allow for increased extraction efficiency during subsequent processing steps.

As heretofore explained, it is desirable to remove as much of the soybean oil as possible from the green bean.

The lower the oil content the better. Preferably the oil content is reduced to 0.5% by weight of the green beans, or even a lower oil content.

In one method of oil separation from the green bean which has been found very satisfactory, and is therefore presently preferred the green soybeans are subjected to presoaking in water at room temperature until the beans have swollen to about twice their normal size. At this point, the green beans have been water saturated and the cell walls softened so that the beans may be easily treated for oil removal. No criticality exists with regard to the water temperature in this presoak step, or as to time involved for the presoak step, the important factor merely being that the beans are soaked in water until saturated.

The presoaked, water saturated green beans are thereafter subjected to a cell disrupting and bean crushing action which may typically be accomplished in a roller mill. The bean crushing, and in the case of a roller mill, flaking operation results in the green bean being compressed and crushed with the cellular material dropping from the rolls in the form of flakes.

The roll milling can be accomplished in any of the well known and commercially available roll mills such as those sold under the trademarks, Lahman, Thropp, Farrell and Lahoff.

During the green bean crushing and cell disrupting operation, the beans are separated from the oil which is expressed from the bean and the oil itself is separately collected and thereafter processed. This manner of oil removal results in breaking down of bean cell walls, as well as efficient separation of the oil to the desirable oil content of no higher than 0.5% by weight of soybean oil.

With regard to the preferred roll milling operation for compressing the green soybeans into cell disrupted flakes and for expelling of the oil, it has been found desirable for the additional reason that flaking of the green soybeans at this stage seems to further facilitate in a desirable manner the subsequent bean grinding in order to achieve a conventional roast and ground coffee appearance.

It should, of course, be understood that other means of mechanical size reduction may be employed at this stage other than roller milling. It is conceivable that even grinding of the green beans at this stage may be employed if desired.

Where the presoaking operation has been employed as part of the oil removal process, as is done in accordance with the presently preferred overall process, it is necessary that the next step be a predrying step. In this predrying step, the oil removed flaked green soybeans are open rack dried in an oven by indirect heat at a temperature within the range of 250° F. to 350° F. in order to drive off excessive moisture. It is preferred in this process step that occasional stirring occur in order to facilitate moisture removal. In this predrying step, the drying should continue until the beans achieve the conventional moisture content of beans at the time they are normally sold, i.e., within the range of from about 11% by weight to about 13% by weight moisture. Where this predrying step is employed, it is important that the heating process be an indirect heating process in order to prevent premature roasting and/or scorching of the beans. A variety of conventionally known devices may be used, such as tumble dryers, continuous flow dryers, screen dryers, and the like. As a general guideline for a three pound batch of beans predrying to the desired moisture levels can be achieved typically within about 20 minutes. As a further general guideline, drying is generally within the desired moisture range at the point at which the predried beans feel "dry to the touch".

In accordance with the next step of the process of this invention, the oil removed green soybean, which in accordance with the preferred process has been cell disrupted and compressed into flakes is ground in a conventional coffee grinder or the like to conventional roast and ground particle sizes. The green bean cellular material is ground to the conventional regular drip or fine grind sizes as those terms are used in the traditional sense in the coffee industry. As a guideline, the standards of these grinds as suggested in the 1940 simplified Practice Recommendation by the U.S. Department of Commerce, (see Coffee Brewing Workshop Manual, p. 33, published by the Coffee Brewing Center of The Pan American Coffee Bureau) are as follows: "Regular grind," 33 percent is retained on a 14 mesh Tyler standard sieve, 55 percent is retained on a 28 mesh Tyler standard sieve and 12 percent passes through a 28 mesh Tyler standard sieve; "drip grind" 7 percent is retained on a 14 mesh Tyler standard sieve and 27 percent passes through a 28 mesh Tyler standard sieve; and "fine grind", 100 percent passes through a percent being retained on a 28 mesh Tyler standard sieve, and 30 percent passing through a 28 mesh Tyler standard sieve.

It is believed that grinding of the green soybean is important, as opposed to grinding of the roasted coffee bean in conventional coffee processing, in that grinding of the green bean exposes more bean particle surfaces, allows driving out of much of the soy taste during the subsequent roasting, and allows the development of a more uniform and complete roast as well as the more full development of a coffee like flavor. Thus, while applicant does not wish to be bound by a theory of operation, it is believed that large surface exposure coupled with the cell disruption allows driving off of much of the typical soy flavor and aroma during the high temperature roasting process.

In the final step of the process of this invention, the green soy particles which have the oil removed therefrom and which have now been ground to a conventional roast and ground coffee particle size, and roasted in much the same manner that coffee beans are roasted. Typical roasting temperatures which have been employed to date range within from about 350° F. to about 425° F. It is believed that slow roasting at the lower end of the temperature scale is preferred. Therefore, presently the most preferred roasting temperature ranges from about 350° F. to about 375° F. Of course, the length of the roasting time will vary depending upon the size of the batch and the like.

As is well known to those skilled in the art of coffee roasting processes, the roasters employed may be batch roasters, continuous roasters, or the like. Moreover, roasting end point is often achieved by color examination as defined by a Hunter Color Scale Value. The Hunter Scale system is a well known means of defining the color of a given material. A complete technical description of the system can be found in an article by R. S. Hunter, "Photoelectric Color Difference Meter", Journal of the Optical Society of America, Vol. 48, pp. 985-95, 1958. Devices specifically designed for the measurement of color on the Hunter scales are described in U.S. Pat. No. 3,003,388 to Hunter, et al., issued Oct. 10, 1961. In general, Hunter Color "L" scale values are units of light reflectance measurement, and the higher the value is, the lighter the color is since a lighter colored material reflects more light. In particular in the Hunter Color system the "L" scale contains 100 equal units of division; absolute black is at the bottom of the scale (L=0) and absolute white is at the top of the scale (L=100). Thus in measuring Hunter Color values of the soy product of this invention, the lower the "L" scale value the darker the product. The "L" scale values described herein are also accurate means of defining the degree of roast necessary to produce a product which when roasted gives a product with the "L" scale values herein described. Determination of optimum roasting conditions varies with the beans employed but is within the skill of one knowledgeable in the field and can be determined after a few Hunter Color measurements of degrees of roast and comparison of the roasted and ground color values with the roasted ground and coffee color values. Of course, the Hunter Color Scale is just one means employed in the coffee industry and many times roasting is to the point at which experienced artisans know the color to be correct based upon years of coffee roasting experience.

After the ground and roast product is prepared as described herein, it may be packaged in the same manner as roast and ground coffee in vacuum cans and shipped for sale.

The ground and roast soybean product has the appearance of roast and ground coffee and may be used for beverage preparation at the same measurement levels of conventional roast and ground coffee to produce a beverage having the same strength characteristics. The ground and roast product may be described as substantially completely oil separated green soybeans which have preferably been cell disrupted by flaking, followed by green bean grinding to allow soy flavor to escape, and finally followed by conventional roasting to provide a ground and roasted soybean product with the oil separated therefrom which has the appearance of conventional roast and ground coffee. In addition, the product may be used to prepare a soy beverage which has the appearance of coffee, as well as the taste of coffee.

From time to time, it has been mentioned herein that the process of this invention is designed to remove as much as possible both the soy flavor and the soy aroma typically characteristic of soybeans. While nearly all of the soy flavor or taste is successfully removed in accordance with the process of this invention, there are certain residual amounts of soy aroma which remain with the product. If desired, the residual soy aroma may be successfully masked by spraying on the ground and roast soy product, certain minimal levels of actual coffee oil expressed from roast and ground coffee beans. This procedure is familiar to those skilled in the coffee art, since coffee oil itself is very often sprayed upon instant coffee products in order to provide a more nearly roast and ground aroma to such products. In this regard, coffee oil may be distilled coffee oil, or crude coffee oil, but is preferably at the very least a purified coffee oil. The purified coffee oil can be added to the ground and roast soybean product, whose aroma of actual coffee is desired to be increased, at common usage levels, generally in the range of from about 0.1% by weight to about 1.0% by weight of the product.

The final step is, of course, for the ultimate consumer to brew the coffee beverage. Brewing of the beverage of this invention by conventional percolation means is just exactly the same as brewing from conventional roast and ground coffee. The ground and roast soybean particles are placed using typical measurements in a conventional coffee percolator, and the brew is perked with the result being a clear, brown beverage. Consumers who taste the beverage all uniformly remark at its typical coffee appearance and taste.

The following example is offered as a general guideline and is intended to illustrate but not limit the invention.

EXAMPLE

Three pounds of raw green amasoy soybeans having a moisture content of within the range of 11% to 13% by weight were obtained. The beans were presoaked at room temperature water until the beans achieved twice their normal size. At this point it was found that the beans were substantially water saturated. The green, presoaked, water saturated beans were run through a roll mill set to have a 1/16th inch nip spacing. The green beans were crushed, their cell walls destructed, and the cellular material separated from the oil. The oil was collected and saved for future use. The oil content of the flaked green bean was examined and found to be at a maximum level of 0.5% by weight. The green bean, cell disrupted, flaked soybeans having the oil removed were thereafter open rack dried in an oven at 250° F. with occasional stirring. A three pound batch was dried for 20 minutes until it felt dry to the touch and was found to have a moisture content of about 11% by weight.

Thereafter, the beans were ground to conventional roast and ground coffee particle size as described previously herein. Finally, the ground green beans were roasted at a roast temperature of 350° F. until the product gave a conventional roast and ground coffee appearance in terms of color. This took 45 minutes.

The resulting ground and roasted soybean product was used in a conventional coffee percolator to brew beverage in the conventional manner. The beverage was tasted by numerous consumers who described the product as having the appearance of coffee, and the taste of coffee, although it was noted to have some soy aroma. The consumers also noted that the ground and roasted product also had the appearance of conventional roasted and ground coffee.

Therefore, it can be seen that the invention as described accomplishes at least all of its stated objects.

What is claimed is:

1. A process of preparing a coffee substitute soybean beverage, consisting essentially of, presoaking green soybeans in water to soften said beans, crushing said soaked beans to expel the oil therefrom and to
   disrupt at least some of the bean cell walls, separating soybean oil from the crushed green bean, to provide
   a soybean oil content of crushed green bean of about 0.5% or less by weight, pre-drying said crushed bean until it feels substantially dry, grinding the cell wall crushed green beans to conventional roast and ground coffee particle size, and
   slow roasting said ground bean at a temperature of from about 350° F. to about 425° F. until the roasted ground beans have a conventional roast color appearance of roasted and ground coffee.

2. The process of claim 1 wherein said presoak continues until said beans swell to at least twice their normal size.

3. The process of claim 1 wherein said beans are crushed in a roller mill.

4. The process of claim 1 wherein said predrying is an indirect heat predrying at a temperature within the range of from about 250° F. to about 350° F.

5. The process of claim 1 wherein said roasting is a slow roast at from about 350° F. to about 375° F.

* * * * *